US009828001B2

United States Patent
Kusano et al.

(10) Patent No.: US 9,828,001 B2
(45) Date of Patent: Nov. 28, 2017

(54) CONFIDENCE ICONS FOR APPRISING A DRIVER OF CONFIDENCE IN AN AUTONOMOUS OPERATION OF A VEHICLE

(71) Applicant: Toyota Motor Engineering & Manufacturing North America, Inc., Erlanger, KY (US)

(72) Inventors: Kristofer D. Kusano, Ann Arbor, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/095,122

(22) Filed: Apr. 10, 2016

(65) Prior Publication Data

US 2017/0291615 A1 Oct. 12, 2017

(51) Int. Cl.
| | |
|---|---|
| *B60W 50/14* | (2012.01) |
| *B60W 30/00* | (2006.01) |
| *G01C 21/30* | (2006.01) |
| *B60W 50/04* | (2006.01) |
| *G07C 5/08* | (2006.01) |
| *G05D 1/00* | (2006.01) |
| *B60W 50/00* | (2006.01) |
| *B60W 50/02* | (2012.01) |

(52) U.S. Cl.
CPC ........ *B60W 50/14* (2013.01); *B60W 50/0097* (2013.01); *B60W 50/0205* (2013.01); *B60W 50/045* (2013.01); *G05D 1/0088* (2013.01); *G07C 5/0808* (2013.01); *G07C 5/0825* (2013.01); *B60W 2050/146* (2013.01)

(58) Field of Classification Search
CPC ... B60W 50/14; B60W 30/00; G01C 21/3641; G01C 21/16; G01C 21/30; B60R 1/00; G08G 1/01; B64D 45/00
See application file for complete search history.

(56) References Cited

U.S. PATENT DOCUMENTS

| | | | | |
|---|---|---|---|---|
| 7,840,345 | B2* | 11/2010 | Miyoshi | G01C 21/30 340/995.28 |
| 9,567,100 | B2* | 2/2017 | Jackson | B64D 45/00 |
| 2003/0060937 | A1* | 3/2003 | Shinada | G01C 21/3641 701/1 |
| 2006/0002587 | A1* | 1/2006 | Takahama | B60R 1/00 382/103 |
| 2010/0256898 | A1* | 10/2010 | Gassner | G08G 1/01 701/117 |

(Continued)

*Primary Examiner* — Yuri Kan
(74) *Attorney, Agent, or Firm* — Christopher G. Darrow; Darrow Mustafa PC

(57) ABSTRACT

Arrangements described herein can present a confidence in an autonomous operation of a vehicle to one or more users. At least one operational status for a support system of the vehicle can be acquired. Based on the acquired operational status, a confidence in the autonomous operation of the vehicle can be determined. Responsive to determining the confidence in the autonomous operation of the vehicle, a confidence icon can be caused to be displayed within the vehicle. The confidence icon can include an emoticon that conveys an emotion corresponding to the determined confidence.

15 Claims, 4 Drawing Sheets

(56) References Cited

U.S. PATENT DOCUMENTS

2011/0313650 A1* 12/2011 Tom .................. G01C 21/16
                                                701/505
2014/0222277 A1*  8/2014 Tsimhoni ............ B60W 30/00
                                                 701/23
2015/0314780 A1* 11/2015 Stenneth ............ B60W 30/00
                                                 701/23

* cited by examiner

CONFIDENCE ICONS FOR APPRISING A DRIVER OF CONFIDENCE IN AN AUTONOMOUS OPERATION OF A VEHICLE

FIELD

The subject matter described herein relates in general to in-vehicle displays and, more particularly, to in-vehicle displays configured to present a confidence level for vehicle operation.

BACKGROUND

Some vehicles include one or more autonomous and/or highly automated operational modes in which a computing system is used to navigate and/or maneuver the vehicle along a travel route with varying levels of input from a human driver, depending on the particular autonomous mode. Many vehicles also have alert systems for notifying drivers and passengers when a particular component or system is malfunctioning. The notifications issued by the alert system can be audible alerts, visual alerts, etc. However, such alert systems do not notify drivers and passengers as to whether or not the autonomous systems used to navigate and/or maneuver the vehicle along a travel route are operating in an ideal manner. Also, such alert systems do not notify drivers and passengers when such systems are operating in a less-than ideal manner, yet are still operable. Finally, such alert systems do not predict along the future rout of the vehicle's route.

SUMMARY

In one respect, the present disclosure is directed to a method of presenting a confidence in an autonomous operation of a vehicle. The method can include acquiring at least one operational status for at least one support system of the vehicle. The method can also include determining, based on at least one operational status, a confidence in the autonomous operation of the vehicle. Responsive to determining the confidence in the autonomous operation of the vehicle, the method can include causing a confidence icon to be displayed within the vehicle, the confidence icon including an emoticon conveying an emotion corresponding to the determined confidence in the autonomous operation of the vehicle.

In another respect, the present disclosure is directed to a display system for a vehicle. The system can include at least one support system for the vehicle. The system can further include a processor operatively connected to the at least one support system. The processor can be programmed to initiate executable operations. The executable operations can include acquiring at least one operational status for the at least one support system. The executable operations can also include determining, based on at least one operational status, a confidence in the autonomous operation of the vehicle. The executable operations can further include responsive to determining the confidence in the autonomous operation of the vehicle, causing a confidence icon to be displayed within the vehicle, the confidence icon including an emoticon conveying an emotion corresponding to the determined confidence in the autonomous operation of the vehicle.

In yet another respect, the present disclosure is directed to a vehicle subject to autonomous operation. The vehicle can include one or more support systems configured to support autonomous operation. The vehicle can include an in-vehicle display. The vehicle can further include a processor operatively connected to the one or more support systems and the in-vehicle display. The processor can be programmed to initiate executable operations. The executable operations can include acquiring at least one operational status for the one or more support systems. The executable operations can also include determining, based on the at least one operational status, a confidence in the autonomous operation of the vehicle. The executable operations can further include responsive to determining the confidence in the autonomous operation of the vehicle, causing a confidence icon to be displayed within the in-vehicle display, the confidence icon including an emoticon conveying an emotion corresponding to the determined confidence in the autonomous operation of the vehicle.

DETAILED DESCRIPTION

Figure 1:
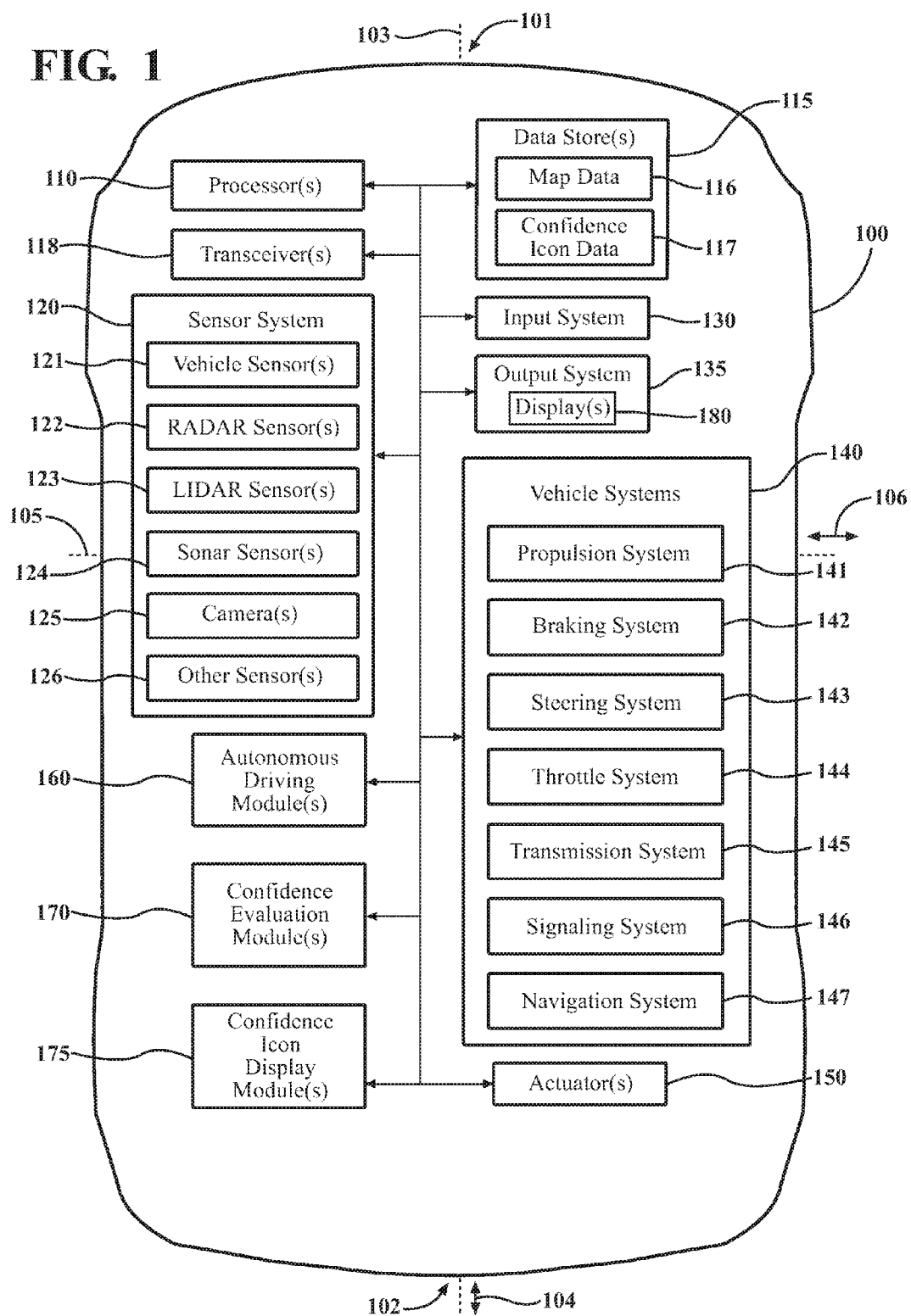
FIG. 1 is an example of a vehicle.
Figure 2:
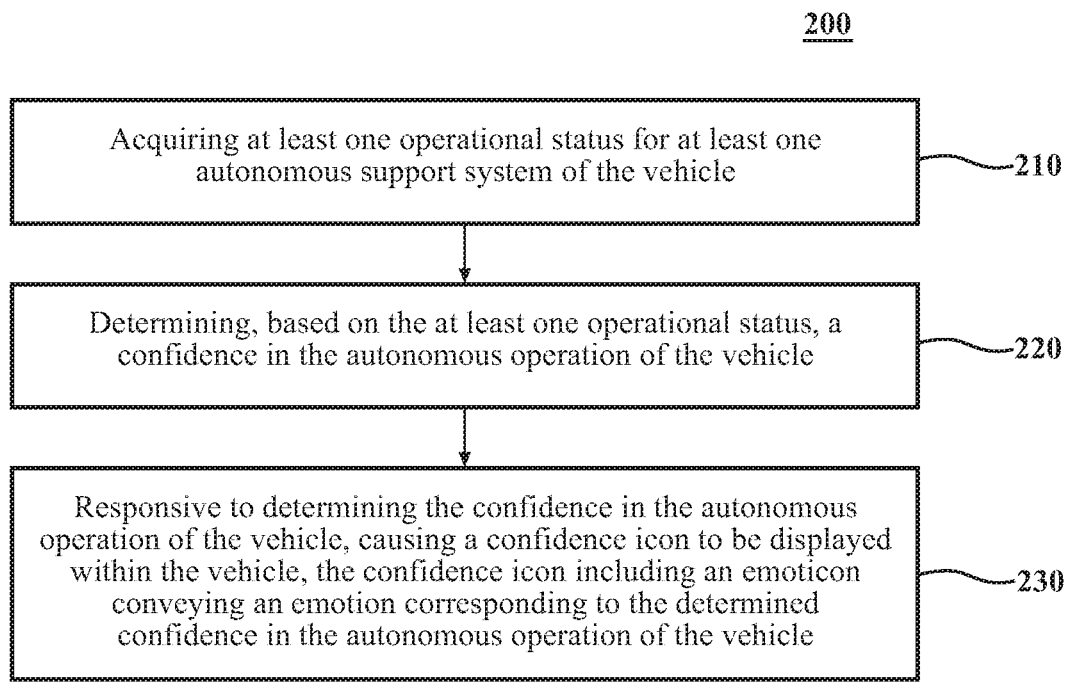
FIG. 2 is an example of a method of presenting a confidence in an autonomous operation of a vehicle.

Arrangements described herein can present a confidence in an autonomous operation of a vehicle to one or more users. At least one operational status for a support system of the vehicle can be acquired. Based on the acquired operational status, a confidence in the autonomous operation of the vehicle can be determined. Responsive to determining the confidence in the autonomous operation of the vehicle, a confidence icon can be caused to be displayed within the vehicle. The confidence icon can include an emoticon that conveys an emotion corresponding to the determined confidence. The present detailed description relates to systems and methods that incorporate one or more of such features. In at least some instances, such systems and methods can improve the performance and/or the safe operation of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to perform one or more autonomous operations. "Autonomous operation" can include any operation performed, at least in part, by one or more computing systems during an autonomous operational mode of the vehicle 100. "Autonomous operational mode" means that one or more computing systems are used to navigate and/or maneuver the vehicle along a travel route with a level of input from a human driver which varies with the operational mode. In one or more arrangements, the vehicle 100 can be highly automated. The systems and components described herein may be configured to communicate and cooperate so as to operate the vehicle in one or more of the autonomous operational modes described below.

The vehicle 100 can have a plurality of autonomous operational modes. For instance, the vehicle 100 can have an unmonitored autonomous operational mode. "Unmonitored autonomous operational mode" means that one or more computing systems are used to maneuver the vehicle along a travel route with no input or supervision required from a human driver. One example of an unmonitored autonomous operational mode is described in the definition of vehicle automation Level 4 (L4), as set forth in the National Highway Traffic Safety Administration in its Preliminary Statement of Policy Concerning Automated Vehicles (May 30, 2013) ("NHTSA 2013 Policy"), which is incorporated herein by reference.

The vehicle 100 can have a monitored autonomous operational mode. "Monitored autonomous operational mode" means that one or more computing systems are used to navigate and/or maneuver the vehicle with at least some human driver supervision and/or control required. One example of a monitored autonomous operational mode is described in the definition of vehicle automation Level 3 or L3, as set forth in the NHTSA 2013 Policy. In some instances, when the vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety-related operations or maneuvers can be implemented.

In one or more arrangements, the autonomous operational modes can include semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. Examples of semi-autonomous operational modes are described in the definitions of vehicle automation Levels 2 (L2) and/or Level 1 (L1), as set forth in the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced. Another example of a semi-autonomous operational mode can be when a lane keeping system of the vehicle is in operation. In such an example, the lateral position of the vehicle can be automatically adjusted to maintain a desired position within one or more lanes of a road.

Alternatively or in addition to the above-described modes, the vehicle 100 can have a manual operational mode. "Manual operational mode" means that a substantial majority or all of the navigation and/or maneuvering of the vehicle along a travel route is performed by a human driver with minimal or no input from (or operation of the vehicle by) a computing system. One example of a manual operational mode is described in the definition of vehicle automation Level 0 (L0), as set forth in the NHTSA 2013 Policy.

The vehicle 100 can be configured to be switched between the various operational modes. Such switching can be implemented in any suitable manner, now known or later developed. The switching can be performed automatically, or it can be done responsive to receiving a manual input or request.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

In some instances, one or more of these elements can be support systems of a vehicle. As used herein, "support systems" can include any component or group of components that assist in the operation of the vehicle 100. For instance, the support system(s) can include one or more of the elements shown in FIG. 1 and described herein.

The vehicle 100 can include one or more processors 110. "Processor" means any component or group of components that are configured to execute any of the processes described herein or any form of instructions to carry out such processes or cause such processes to be performed. The processor(s) 110 may be embodied in one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data store(s) 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. The map data 116 can include information or data on roads, traffic control devices, road markings, structures, features, and/or landmarks in the one or more geographic areas. The map data 116 can be in any suitable form. In one or more arrangements, the map data can include information related to a speed for a roadway. For example, the map data 116 can include speed limits. In some arrangements, the map data can include information on past and/or present speed information for vehicles traveling on roads. For example, the map data 116 can include average speeds for vehicles traveling on a road as compiled over a given time period. Further, the map data 116 can include current speeds of vehicles on the road. The map data 116 can be high quality and/or highly detailed.

In some instances, at least a portion of the map data 116 can be located in one or more data stores 115 located onboard the vehicle 100. Alternatively or in addition, at least a portion of the map data 116 can be located in a data store or source that is located remote from the vehicle 100 (for example, in a GPS system accessible through an in-vehicle GPS receiver). The map data 116 can be obtained by the vehicle 100 in any suitable manner, or it can be provided by an entity (e.g., a vehicle manufacturer) for use by the vehicle 100.

In one or more arrangements, the one or more data stores 115 can include confidence icon data 117. The confidence icon data 117 can include images to be presented to an occupant of the vehicle 100. As described below, the images can include emoticons corresponding to confidence in autonomous operations of the vehicle 100. In some instances, at least a portion of the confidence icon data 117 can be located in one or more data stores 115 located onboard the vehicle 100. Alternatively or in addition, at least a portion of the confidence icon data 117 can be located in a data store or source that is located remote from the vehicle 100. The confidence icon data 117 can be obtained by the vehicle 100 in any suitable manner, or it can be provided by an entity (e.g., a user, another vehicle, a vehicle manufacturer) for use by the vehicle 100.

The vehicle 100 can include one or more transceiver(s) 118. As used herein, "transceiver" is defined as a component or a group of components that transmit signals, receive signals, or transmit and receive signals, whether wirelessly or through a hard-wired connection. The one or more transceiver(s) 118 can be operatively connected to the one or more processors(s) 110 and/or the one or more data store(s) 115. The one or more transceiver(s) 118 can enable communications between the vehicle 100 and other elements, such as nearby vehicles. The one or more transceiver(s) 118 can be any suitable transceivers used to access a network, access point, node, or other device for the transmission and receipt of data.

The one or more transceiver(s) 118 may be wireless transceivers using any one of a number of wireless technologies. Examples of suitable transceivers include a dedicated short-range communication (DSRC) transceiver, cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceiver(s) 118 can include any wireless technology capable of performing, enabling and/or facilitating performance of the transceiver functions described herein. Again, the one or more transceiver(s) 118 can be any suitable combination of transceivers, including any combination of the transceivers noted above.

The vehicle 100 can include a sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, determine, assess, monitor, measure, quantify and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. In one or more arrangements, the vehicle sensor(s) 121 can include a speedometer. The speedometer can determine a current speed of the vehicle 100, or data acquired by the speedometer can be used to determine a current speed of the vehicle 100. The speedometer can include any type of device, including mechanical and/or electronic speedometers. The vehicle sensor(s) 121 can be configured to detect, determine, assess, monitor, measure, quantify, and/or sense one or more characteristics of the vehicle 100.

Alternatively or in addition, the sensor system 120 can include one or more driving environment sensors configured to acquire, detect, determine, assess, monitor, measure, quantify and/or sense driving environment data. "Driving environment data" includes and data or information about the external environment in which a vehicle is located or one or more portions thereof.

As an example, in one or more arrangements, the sensor system 120 can include one or more RADAR sensors 122. "RADAR sensor" means any device, component and/or system that can detect, determine, assess, monitor, measure, quantify and/or sense something using at least in part radio signals. The one or more RADAR sensors 122 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more RADAR sensors 122, or data obtained thereby, can determine the speed of objects in the external environment of the vehicle 100.

In one or more arrangements, the sensor system 120 can include one or more LIDAR sensors 123. "LIDAR sensor" means any device, component and/or system that can detect, determine, assess, monitor, measure, quantify and/or sense objects using at least in part lasers. The LIDAR sensor can include a laser source and/or laser scanner configured to emit a laser signal and a detector configured to detect reflections of the laser signal. The one or more LIDAR sensors 123 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

In one or more arrangements, the sensor system 120 can include one or more sonar sensors 124. "Sonar sensor" means any device, component and/or system that can detect, determine, assess, monitor, measure, quantify and/or sense something using at least in part sound waves. The one or more sonar sensors 124 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

The sensor system 120 can include can include one or more cameras 125. "Camera" includes any device(s), component(s), and/or system(s) that is configured to capture visual data. "Visual data" includes video and/or image information/data. The visual data can be in any suitable form. In one or more arrangements, one or more of the cameras 125 can be oriented, positioned, configured, operable, and/or arranged to capture visual data from at least a portion of the external environment of the vehicle 100. Visual data acquired by the one or more cameras 125 can be used to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

In one or more arrangements, the sensor system 120 can include other sensors 126. The other sensors 126 can include any sensor(s), now known or developed in the future, configured to acquire, detect, determine, assess, monitor, measure, quantify and/or sense information relating to the vehicle 100 and/or the driving environment.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Alternatively or in addition to one or more of the above examples, the sensor system 120 can include one or more sensors configured to detect, determine, assess, monitor, measure, quantify and/or sense the location of the vehicle 100 and/or the location of objects in the environment relative to the vehicle 100. Any suitable sensor can be used for such purposes. Such sensors may work independently and/or in combination with a positioning system of the vehicle 100.

The vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant.

In one or more arrangements, the output system 135 can include one or more displays 180. "Display" is defined as a component or a group of components that present information/data in a form that is perceptible to the human sense of sight. For instance, the display 180 can present video, images, graphics, etc. The display 180 can be any suitable type of display. For instance, the display 180 can be a liquid crystal display (LCD), a light emitting diode (LED) display or some other suitable display. In one or more arrangements, the display 180 can be a heads-up display, a display for a navigation system, and/or a display included in an instrument cluster. The display(s) 180 can be provided in any suitable location within the vehicle 100. In one or more arrangements, the display(s) 180 can be located in a front interior portion of the vehicle 100. As an example, the display(s) 180 can be included in a dashboard or instrument panel (not shown) of the vehicle 100.

The vehicle 100 can include one or more modules, at least some of which will be described herein. Each module can be implemented as computer readable program code that, when executed by a processor, implement one or more of the various processes described herein. One or more of the modules can be a component of the processor(s) 110, or one or more of the modules can be executed on and/or distributed among other processing systems and/or elements to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, the hardware and/or software elements configured for performing the functions of a particular module may be distributed among a plurality of elements and/or locations. In one or more arrangements, two or more of the modules described herein can be combined into a single module.

The vehicle 100 can include one or more autonomous driving modules 160. The autonomous driving module(s) 160 can receive data from the sensor system 120, the input system 130, and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, capture, and/or determine location information for objects within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, the map data 116, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

The vehicle 100 can include one or more confidence evaluation modules 170. In one or more arrangements, the confidence evaluation module(s) 170 can determine a confidence in an autonomous operation of the vehicle 100. As used herein, "confidence" includes any determination made relating to the ability of the vehicle 100 to perform an autonomous operation. The confidence can be determined based on, or otherwise associated with, any suitable factors, such as one or more operational statuses of one or more of the support systems of the vehicle 100. For instance, the confidence can be based on an operational status of one or more of the processor(s) 110, the data store(s) 115, the sensor system 120, the input system 130, the output system 135, one or more of the vehicle systems 140, the actuator(s) 150, the autonomous driving module(s) 160, the confidence evaluation module(s) 170, the confidence icon display module(s) 175, and/or any other system of the vehicle 100.

As used herein, "operational status" can include any information relating to the operation of a support system of the vehicle 100. In one or more arrangements, the operational status can include a measure of functional performance of a support system of the vehicle 100. For example, the confidence can be based on the functional performance of the sensor system 120 and/or the vehicle systems 140. In one or more arrangements, the functional performance of a component can include any quantitative and/or qualitative measurement. In some instances, the functional performance can include whether or not a system is performing at a desired functional level. For example, the confidence can be determined based on an operational status indicating a functional level of the sensor system 120. If the vehicle 100 is operating such that one or more sensors are not performing optimally, the confidence evaluation module(s) 170 can determine a confidence in the autonomous operation considering that the one or more sensors are not operating optimally.

In one or more arrangements, the operational status can include information acquired by one or more of the autonomous support systems of the vehicle 100. For example, the confidence can be based on information acquired by the processor(s) 110, the transceiver(s) 118, the sensor system 120, and/or the input system 130. The operational status can include driving environment data acquired by the sensor system 120. For example, the operational status can include data acquired from the RADAR sensor(s) 122, the LIDAR sensor(s) 123, the sonar sensor(s) 124, and/or the camera(s) 125. In some arrangements, the operational status can include driving environment data relating to nearby vehicles, other objects, and/or road conditions as sensed by the sensor system 120. The operational status can include data saved in the data store(s) 115. For instance, the operational status can include data of an environment stored in the map data 116.

In one or more arrangements, the confidence evaluation module(s) 170 can be configured to identify a current state of autonomy that the vehicle 100 is operating in and/or capable of operating in. For instance, the confidence evaluation module(s) 170 can be configured to identify whether the vehicle 100 is operating under one of the autonomous operational modes described above. In some arrangements, the confidence evaluation module(s) 170 can be configured to identify one or more semi-autonomous modes or features (e.g., cruise control, adaptive cruise control, lane keeping, etc.) that the vehicle 100 is capable of performing.

The confidence can be determined for any autonomous operation of the vehicle 100. In some arrangements, the confidence can be determined for an autonomous operational mode. Alternatively or in addition, a confidence can be determined for semi-autonomous functions that the vehicle 100 is capable of performing.

In one or more arrangements, the confidence evaluation module(s) 170 can determine a confidence for a past, present, and/or future autonomous operation of the vehicle 100. In some arrangements, a confidence for a past autonomous operation can be determined based on an operational status previously acquired. A confidence for a present autonomous operation can be determined based on an operational status being acquired in substantially real-time. A confidence for a future autonomous operation of the vehicle 100 can be determined based on an operational status being acquired in substantially real-time and/or any other suitable factors. For example, the confidence for a future autonomous operation of the vehicle 100 can be based on information acquired during past travels of the vehicle 100. The information acquired during past travels can include a previously determined confidence on the same or similar travel route. Alternatively or in addition, the confidence for a future autonomous operation can be based on map data 116 and/or information received from nearby vehicles (such as information acquired by the transceiver(s) 118, e.g., by DSRC or by cellular modem).

The confidence evaluation module(s) 170 can determine a confidence based on predefined criteria. For example, any combination of predefined instructions, functions, algorithms, and/or look-up tables can be used to correlate, interpret, and/or process operational status and other information, to determine the confidence in an autonomous operation. Such criteria can allow the confidence to be determined based on variables such as the operational status of a support system. In one or more arrangements, the confidence can be based on a plurality of operational statuses from one or more support systems of the vehicle 100. For example, the confidence can be based on operational statuses from one or more sensors of the sensor system 120. The weighting of the factors used to determine a given confidence may be predefined or the weighting may be dynamically determined based on such factors as, for example, the operational status(es) of one or more particular support systems, driving environment data relating to nearby vehicles, other objects, road conditions as sensed by the sensor system 120, and/or other pertinent information.

The determined confidence can be in any suitable form. For instance, the confidence can be a confidence level that is an absolute numerical value, a scaled or relative numerical value, a percentage value, a weighted factor, one or more ranges of confidence, and/or any other way of characterizing confidence in an autonomous operation of the vehicle 100. In one non-limiting instance, the confidence level can be determined to be "high," "medium," and/or "low" based on predetermined threshold values or ranges of values. In some arrangements, information relating to the functions, algorithms, and look-up tables used to determine the confidence, and/or the form of the confidence can be stored in the data store(s) 115.

The vehicle 100 can include one or more confidence icon display modules 175. In one or more arrangements, the confidence icon display module(s) 175 can be configured to cause a confidence icon to be displayed within the vehicle 100. In some arrangements, such causing can be performed by one or more elements of the vehicle 100, such as the confidence icon display module(s) 175, the autonomous driving module(s) 160, and/or the processor(s) 110. The confidence icon can correspond to a confidence determined by the confidence evaluation module(s) 170.

In one or more arrangements, the confidence icon can include one or more emoticons. As used herein, "emoticon" can include any image or images configured to convey one or more emotions to a viewer. The emoticon(s) can include smiley faces, avatars, photos of people or animals, and/or any other anthropomorphic images. In one or more arrangements, the emoticon(s) can be configured to convey a particular emotion or set of emotions to a user. For example, the emoticon can convey a positive, neutral, and/or negative emotion. Some other non-limiting of emotions conveyed by an emoticon can include happiness, successfulness, confidence, calmness, sadness, anger, frustration, and/or stressfulness. Various non-limiting examples of emoticons are described below with reference to FIGS. 3-6. In one or more arrangements, the confidence icon, including the emoticon, can be viewable on the display(s) 180 of the vehicle 100.

In one or more arrangements, the confidence icon display module(s) 175 can be configured to present emoticon(s) that are user-configurable. "User-configurable" can include any emoticons in which a user of the vehicle 100 can create, modify, upload, download, assign, correlate, and/or otherwise customize. In some arrangements, a user can create their own confidence icons by saving one or more emoticons. For example, photos of people or pets can be used as emoticons. A user can upload and/or download one or more photos to the confidence icon data 117. In some arrangements, the confidence icons can be assignable, by a user, to one or more confidences. For example, a user can assign an emoticon that provides positive emotions (e.g., smiley face, friend's photo) for high levels of confidence. Further, a user can assign an emoticon that conveys negative emotions (e.g., sad face, photo of disliked person/animal) for low levels of confidence. In one or more arrangements, the emoticon(s) can be user-configurable upon receiving an input from a user through the input system 130.

The confidence icon display module(s) 175 can be configured to present confidence icon(s) at any suitable time. In some arrangements, the confidence icon display module(s) 175 can display the confidence icon(s) based on a user input. For example, a user can indicate, via the input system 130 for example, that they wish to view the confidence icon(s) relating to a particular autonomous capability. Alternatively or in addition, the confidence icon(s) can be presented at other times. In some arrangements, the confidence icon(s) can be presented when it is determined that the vehicle 100 has changed autonomous modes. For example, if the vehicle 100 is being switched from a manual to an automated mode, the confidence icon(s) for the automated mode can be presented. In one or more arrangements, the confidence icons(s) relating to a particular autonomous capability can be presented when a determined confidence in the autonomous capability changes during an autonomous operation of the vehicle 100.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed.

The navigation system 147 can include one or more mechanisms, devices, elements, components, systems, applications and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, the vehicle may operate either partially or fully autonomously.

The processor(s) 110 and/or the autonomous driving module(s) 160 may be operable to control the navigation and/or maneuvering of the vehicle 100 by controlling one or more of the vehicle systems 140 and/or components thereof. For instance, when operating the vehicle in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

In some instances, such as when the vehicle 100 is an autonomous vehicle, the vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. However, when the vehicle 100 is a conventional vehicle, the vehicle 100 may or may not include the one or more actuators 150.

Now that the various potential systems, devices, elements and/or components of the vehicle 100 have been described, various methods of presenting confidence levels within the vehicle 100 will now be described. The method 200 illustrated in FIG. 2 may be applicable to the embodiments described above in relation to FIG. 1, but it is understood that the method 200 can be carried out with other suitable systems and arrangements. Moreover, methods may include other steps that are not shown here, and in fact, the methods are not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously. Various possible steps of method 200 will now be described.

At block 210, an operational status for at least one support system of the vehicle 100 can be acquired. As described above, the support system can include any element or group of elements of the vehicle 100. In one or more arrangements, the operational status can include information relating to an environment that the vehicle 100 is in. For example, the operational status can include data acquired by the sensor system 120 (e.g., the vehicle sensor(s) 121, the RADAR sensor(s) 122, the LIDAR sensor(s) 123, the sonar sensor(s) 12, the camera(s) 125). Additional non-limiting examples of the operational status can include information about nearby vehicles or obstacles, information regarding roadway markings (e.g., lane markers), and/or weather conditions. In some arrangements, the operational status can include information relating to the functionality of one or more components of the vehicle 100. For example, the operational status can be the functionality (e.g., whether a component is functioning at a desired level) of portions of the sensor system 120 and/or the vehicle systems 140. The determining can be performed continuously, periodically, irregularly, or even randomly. The method 200 can continue to block 220.

At block 220, a confidence in the autonomous operation of the vehicle can be determined based on the operational status for at least one support system of the vehicle. The confidence can be for an automation mode of the vehicle. For example, the confidence can be determined for operation of the vehicle in one or more of the above-defined automation modes (e.g., L1, L2, L3, L4 as set forth in the NHTSA 2013 Policy). Alternatively or in addition, the confidence can be determined for particular components of an automation mode. For example, a confidence can be determined for a longitudinal automated control and/or a lateral automated control of the vehicle 100. In one or more arrangements, the confidence can be determined for a past autonomous operation, a present autonomous operation, and/or a future autonomous operation.

The determining the confidence can be accomplished in a predefined manner. For instance, as mentioned above, the confidence can be determined using one or more predefined instructions, algorithms, functions, and/or look-up tables. For example, as previously described, the predefined instructions, algorithms, functions, and/or look-up tables can be stored in the one or more data store(s) 115. The determination can be based on a particular automated or semi-automated mode of the vehicle 100.

In one or more arrangements, the determination can be done by the processor(s) 110, the confidence evaluation module(s) 170, and/or the autonomous driving module(s) 160. Such determining can be done continuously, periodically, irregularly, or even randomly. The determination can be made in real-time. The method 200 can continue to block 230.

At block 230, responsive to determining the confidence in the autonomous operation of the vehicle, a confidence icon can be caused to be displayed within the vehicle. In one or more arrangements, the confidence icon can be an emoticon having an emotion corresponding to the determined confidence in the autonomous operation of the vehicle. For example, a relatively higher confidence in the vehicle's capacity to operate autonomously at a given level may be represented by a "smiley-face", an emoticon such as emoticon 624 in FIG. 6, or any other symbol conveying a positive emotion. Conversely, a relatively lower confidence in the vehicle's capacity to operate autonomously at a given level may be represented by an emoticon such as emoticon 628 in FIG. 6 or any other symbol conveying a negative emotion. In one or more arrangements, the confidence icon can be displayed within the display 180 of the vehicle 100. In one or more arrangements, the confidence icon can include an automation mode indication and an emoticon. Alternatively or in addition, the confidence icon can include an emoticon for a particular portion of automated control for the vehicle. In one or more arrangements, a confidence icon, such as an emoticon, can be displayed for the present automated operation of the vehicle 100. Alternatively or in addition, a confidence icon can be displayed for past and/or future automated operations. Such causing to be displayed can be done continuously, periodically, irregularly, or even randomly. The method 200 can end. Alternatively, the method 200 can return to block 210. As a further alternative, the method 200 can include additional and/or alternative blocks (not shown).

Figure 3:
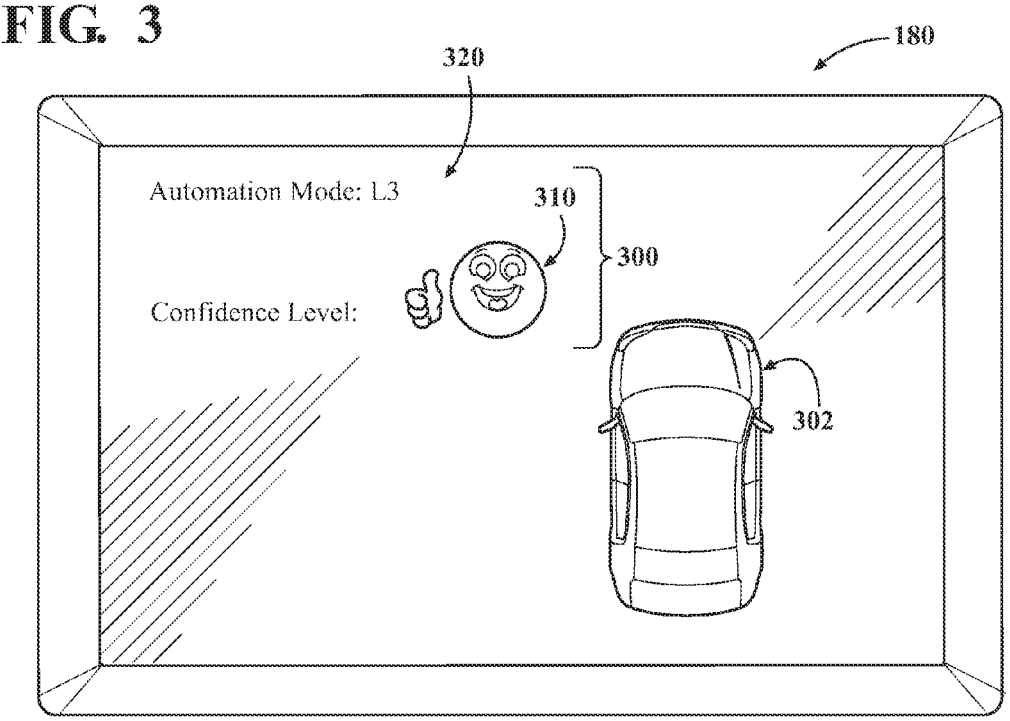
FIG. 3 shows a first example of a vehicle display presenting a confidence icon.

Non-limiting examples of the confidence level presentation in accordance with the method 200 will now be described. Referring to FIG. 3, a first example of a confidence icon being displayed can be described. In one or more arrangements, the confidence icon 300 can be displayed on the display(s) 180 of the vehicle 100. As mentioned above, the display 180 can be any suitable in-vehicle display, such as a liquid crystal display (LCD), a light emitting diode (LED) display, and/or a heads-up display. The display(s) 180 can be provided in any suitable location within the vehicle 100.

In one or more arrangements, the confidence icon 300 can include an automation mode indicator 320 to indicate an autonomous mode the vehicle 100 is configured to operate in. For example, the automation mode indicator 320 can indicate if the vehicle 100 is operating in one of the above-defined automation modes as set forth in the NHTSA 2013 Policy. Alternatively or in addition, the automation mode indicator 320 can indicate other autonomous or semi-autonomous features (e.g., adaptive cruise control and/or lane-keeping). In the example shown in FIG. 3, the automation mode indicator 320 can show "L3." In one or more arrangements, other icons, such as vehicle icon 302, can be presented with other information relating to the autonomous operation of the vehicle 100.

In one or more arrangements, the confidence icon 300 can include an emoticon 310 that corresponds to a confidence in an autonomous operation of the vehicle. The emoticon 310 can be configured to convey a particular emotion to an occupant of the vehicle 100. For example, the emoticon 310 can convey a positive emotion (e.g., happy, confident), as shown in the example in FIG. 3. Alternatively, the emoticon 310 can convey negative emotions (e.g., nervousness, anger, sadness, uneasiness, boredom, apprehension, fear, trust, disgust, pensiveness).

In one or more arrangements, the confidence icon 300 can correspond to a determined confidence in an autonomous operation of the vehicle. In the example of FIG. 3, the confidence can be determined for the automation mode L3. The determination can be based on instructions stored in the data store(s) 115 and on one or more operational statuses for support systems of the vehicle 100. For example, the confidence determined for the automation mode can be based on operational statuses acquired from the sensor system 120, such as data from the RADAR sensor(s) 122, the LIDAR sensor(s) 123, the sonar sensor(s) 124, and/or the camera(s) 125. The operational statuses used in the confidence determination can also include information about the driving environment of the vehicle 100.

In one or more arrangements, an emotion conveyed by the emoticon 310 can correspond to the determined confidence. As previously described, in some arrangements, if the confidence in an autonomous operation of the vehicle is determined to be high, a positive emotion can be conveyed through the emoticon 310. In the example shown in FIG. 3, a positive emoticon 310 is shown for the automation mode L3. In some arrangements, a negative emotion can be conveyed by a displayed emoticon if the confidence is determined to be low.

Figure 4:
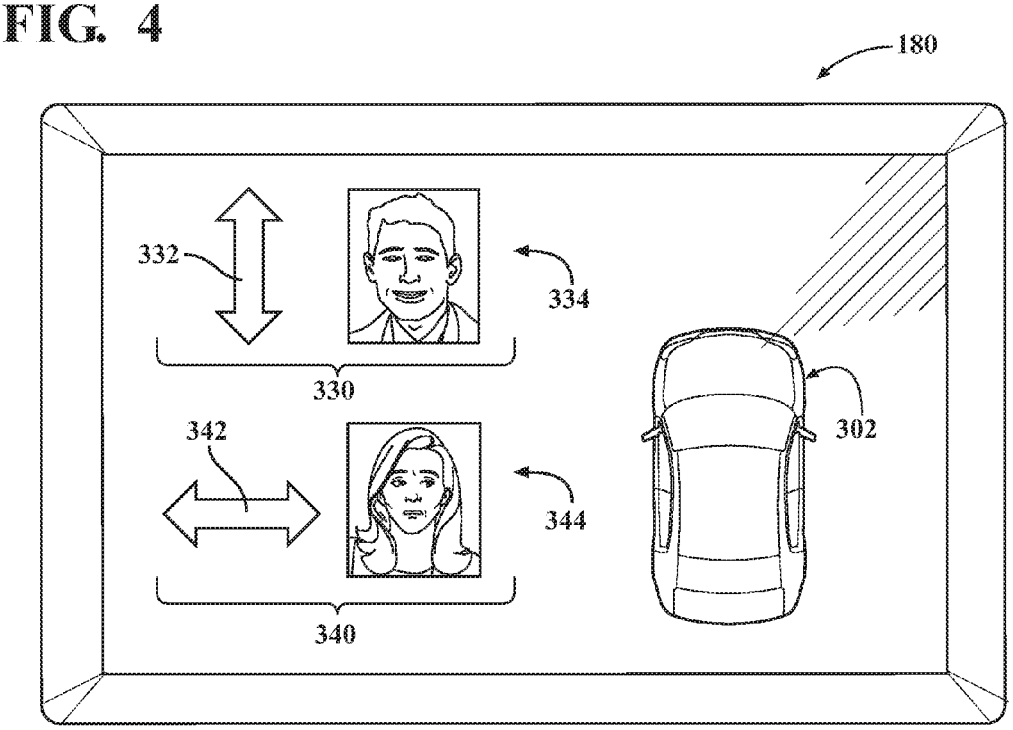
FIG. 4 shows a second example of a vehicle display presenting confidence icons.

Referring to FIG. 4, a second example of confidence icons being presented can be described. In one or more arrangements, confidence icons can be displayed for particular components of an autonomous operation. The particular components of an autonomous operation can include autonomous control in a longitudinal direction and in a lateral direction. For example, a longitudinal confidence icon 330 and/or a lateral confidence icon 340 can be presented on the display 180. The longitudinal confidence icon 330 can include a longitudinal direction indicator 332 and a longitudinal direction control confidence emoticon 334. The lateral confidence icon 340 can include a lateral direction indicator 342 and/or a lateral direction control confidence emoticon 344. In one or more arrangements, the longitudinal direction indicator 332 and/or the lateral direction indicator 342 can include one or more arrows indicating particular directions. Alternatively or in addition, other indicators may be used to convey particular components of an automatous operation. For example, the display can include reference to directional automated or semi-automated systems, such as adaptive cruise control and/or lane keeping.

The example shown in FIG. 4 shows distinct confidence icons 330/340 based on directional components. For example, a confidence can be determined for automated operation in the longitudinal direction of the vehicle. The confidence for the longitudinal direction can be based on, for example, operational statuses acquired from the sensor system 120 relating to the driving environment ahead of the vehicle 100. Such information can include the detection of obstacles and/or other vehicles in front of the vehicle 100.

A confidence can also be determined for automated operation in the lateral direction of the vehicle. The confidence for the lateral direction can be based on, for example, operational statuses acquired from the sensor system 120 relating to the driving environment in multiple directions around the vehicle. Such information can include the detection of obstacles, other vehicles, and/or lane markings near the sides of the vehicle 100.

In the example shown in FIG. 4, the longitudinal confidence emoticon 334 can convey a positive emotion, which can indicate high confidence. The lateral confidence emoticon 344 can convey a negative or neutral emoticon, which can indicate a low or medium confidence. In the non-limiting example of FIG. 4, the emoticons 334 and 344 can convey to a user that there is high confidence in the longitudinal direction (for adaptive cruise control operation, for example) and that there is a low confidence in the lateral direction (for lane-keeping operation, for example). Such an example can convey to a user that control and/or monitoring of lateral control of the vehicle 100 may be required.

Figure 5:
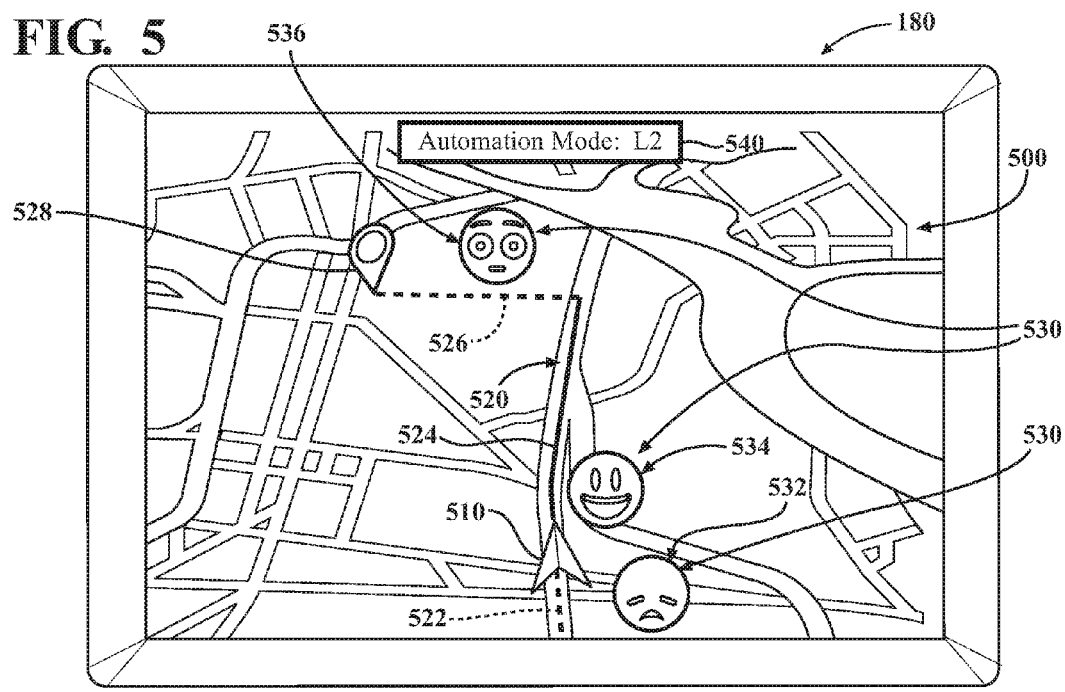
FIG. 5 shows a third example of a vehicle display presenting confidence icons.
Figure 6:
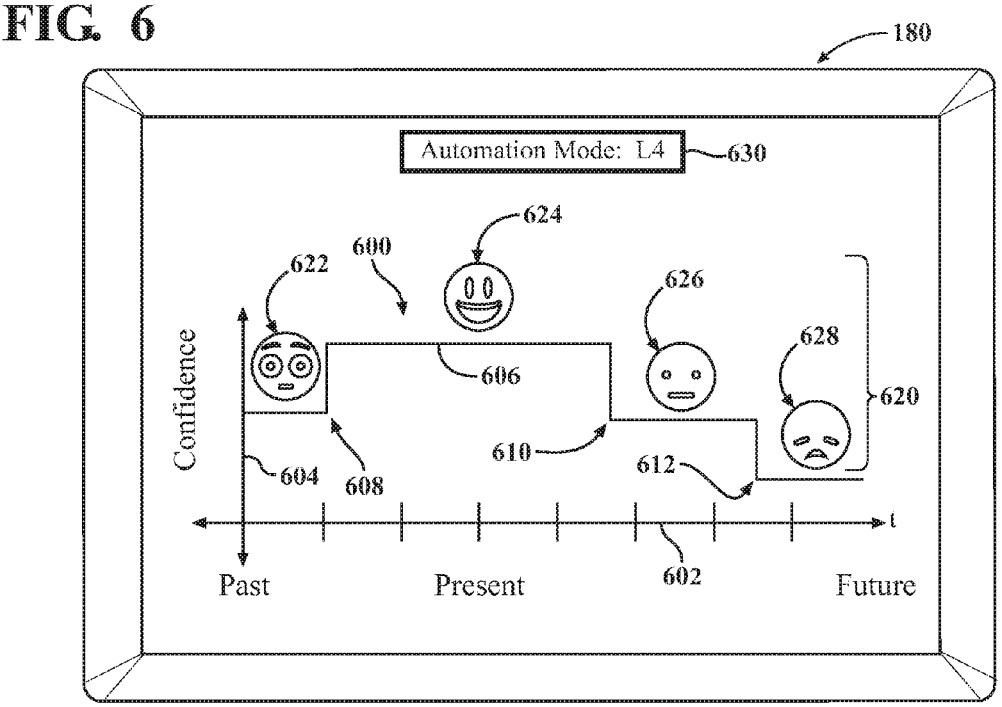
FIG. 6 shows a fourth example of a vehicle display presenting confidence icons.

FIGS. 5 and 6 show different arrangements in which a past, present, and/or future confidence icon can be presented. Referring to FIG. 5, confidence icons can be presented together with a map 500 within the display 180. Within the map 500, a vehicle marker 510 can be shown. In one or more arrangements, a route 520 can be indicated within the map 500. The route 520 can include past travel path 522, a present travel path 524, and a future travel path 526. In one or more arrangements, confidence icons can be associated with one or more of the past travel path 522, the present travel path 524, and/or a future travel path 526. For example, a past travel emoticon 532, a present travel emoticon 534, and/or a future travel emoticon 536 can be shown near the past travel path 522, the present travel path 524, and/or a future travel path 526.

In one or more arrangements, an automation mode indicator 540 can be shown to indicate an autonomous mode the vehicle 100 is configured to operate in. In the example shown in FIG. 5, the automation mode indicator 540 can show "L2."

In the example of FIG. 5, a confidence for the past travel path 522 can be determined to be low. Accordingly, the past travel emoticon 532 can convey a negative emotion (e.g., sadness). In one or more arrangements, a confidence for the present travel path 524 can be determined to be high. Accordingly, the present travel emoticon 534 can convey a positive emotion (e.g., happiness). In some arrangements, a confidence for the future travel path 526 can be determined to be medium and/or unknown. Accordingly, the future travel emoticon 536 can convey a neutral emotion.

Referring now to FIG. 6, confidence icons 620 can be presented that correspond to confidence determined over a period of time. In one or more arrangements, the confidence icons 620 can be presented together with a graphical representation of a determined confidence based on time. For example, a confidence level 606 can be shown plotted on a graph having a confidence axis 604 and a time (t) axis 602. In such an example, the confidence level 606 can be shown as a function of time. In one or more arrangements, the confidence icons 620 can be presented near the plotted confidence level 606. For example, when the confidence level 606 changes, a confidence icon 620 can be shown nearby.

In the example shown in FIG. 6, determined confidence in an autonomous operation of the vehicle 100 can be presented for a past time, the present, and a future time. The past time can have a confidence determined to be at a medium level. The first emoticon 622 can convey a neutral emotion associated with this time. At first time 608 the confidence level can be determined to rise to a high level. The second emoticon 624 can convey a positive emotion associated with the time period, which includes the present time. At a second time 610 the confidence level can be determined to lower to a medium level. The third emoticon 626 can convey a neutral emotion associated with the time period beginning at the second time 610, which can be a future time. At a third time 612 the confidence level can be determined to lower to a low level. The fourth emoticon 628 can convey a negative emotion associated with the time period beginning at the third time 612, which can be a future time.

In one or more arrangements, an automation mode indicator 630 can be shown to indicate an autonomous mode the vehicle 100 is configured to operate in. In the example shown in FIG. 6, the automation mode indicator 630 can show "L4."

As previously mentioned, the confidence icons can be user-configurable. As such, any of the confidence icons, including the emoticons, described with reference to FIGS. 3-6 can be user-configurable. The user-configurable confidence icons can include indicators and/or emoticons that are uploadable, selectable, customizable, correlatable, and/or assignable by a user of the vehicle 100.

It will be appreciated that arrangements described herein can provide numerous benefits, including one or more of the benefits mentioned herein. For example, arrangements described herein can improve occupant comfort within the vehicle. Arrangements described herein can provide an aesthetic and convenient display to convey a confidence level for one or more vehicle systems. The confidence icons can be emoticons that can quickly and easily convey an emotion to a user that corresponds to a confidence in the operation of the vehicle. For example, a user can view the confidence icons to quickly determine whether or not a change in attention or action is required by the user. Arrangements described herein can eliminate the need for numeric displays for confidence levels, avoiding the necessity of a user to manually correlate a numeric confidence value to potential action.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of presenting a confidence in an autonomous operation of a vehicle, the method comprising:
    acquiring at least one operational status for at least one support system of the vehicle;
    determining, based on the acquired at least one operational status, a first confidence for an autonomous operation for adjusting a speed of the vehicle;
    determining, based on the acquired at least one operational status, a second confidence for an autonomous operation for adjusting a position of the vehicle within a lane of a roadway;
    responsive to determining the first confidence, causing a first confidence icon to be displayed within the vehicle, the first confidence icon including an emoticon conveying an emotion corresponding to the determined first confidence for the autonomous operation for adjusting the speed of the vehicle;
    responsive to determining the second confidence, causing a second confidence icon to be displayed within the vehicle, the second confidence icon including an emoticon conveying an emotion corresponding to the determined second confidence for the autonomous operation for adjusting the position of the vehicle within the lane of the roadway.

2. The method of claim 1, wherein the at least one support system includes a sensor system of the vehicle.

3. The method of claim 2, wherein the at least one operational status includes information acquired by the sensor system of the vehicle.

4. The method of claim 2, wherein the at least one operational status includes a measure of functionality of a portion of the sensor system.

5. The method of claim 1, wherein the determining the first confidence in the autonomous operation includes determining a first confidence level.

6. The method of claim 5, wherein the first confidence level has an associated first emoticon.

7. The method of claim 5, further comprising the step of receiving, from a user, an input assigning an emoticon to one or more confidence levels.

8. The method of claim 1, further including identifying a first state of autonomous operation of the vehicle, and wherein the determining the first confidence in the autonomous operation of the vehicle is further based on the first state of autonomous operation of the vehicle.

9. A display system for a vehicle configured for an autonomous operation, the system comprising:
    at least one support system for the vehicle; and
    a processor operatively connected to the at least one support system, the processor being programmed to initiate executable operations comprising:
    acquiring at least one operational status for the at least one support system of the vehicle;
    determining, based on the acquired at least one operational status, a first confidence for an autonomous operation for adjusting a speed of the vehicle;
    determining, based on the acquired at least one operational status, a second confidence for an autonomous operation for adjusting a position of the vehicle within a lane of a roadway;
    responsive to determining the first confidence, causing a first confidence icon to be displayed within the vehicle, the first confidence icon including an emoticon conveying an emotion corresponding to the determined first confidence for the autonomous operation for adjusting the speed of the vehicle;
    responsive to determining the second confidence, causing a second confidence icon to be displayed within the vehicle, the second confidence icon including an emoticon conveying an emotion corresponding to the determined second confidence for the autonomous operation for adjusting the position of the vehicle within the lane of the roadway.

10. The system of claim 9, wherein the at least one support system for the vehicle includes a sensor system, and the at least one operational status includes information acquired by the sensor system.

11. The method of claim 1, wherein the determining the second confidence in the autonomous operation includes determining a second confidence level.

12. The method of claim 11, wherein the second confidence level has an associated second emoticon.

13. The method of claim 1, further including identifying a second state of autonomous operation of the vehicle, and wherein the determining the second confidence in the autonomous operation of the vehicle is further based on the second state of autonomous operation of the vehicle.

14. A method of presenting a confidence in an autonomous operation of a vehicle, the method comprising:
  acquiring at least one operational status for at least one support system of the vehicle;
  determining, based on the acquired at least one operational status, a first confidence for an autonomous operation of the vehicle along a present travel path;
  determining, based on the acquired at least one operational status, a second confidence for the autonomous operation of the vehicle along a future travel path;
  responsive to determining the first confidence, causing a first confidence icon to be displayed with a map within the vehicle, the first confidence icon including an emoticon conveying an emotion corresponding to the determined first confidence for the autonomous operation of the vehicle along the present travel path, the first confidence icon being presented near the present travel path on the map; and
  responsive to determining the second confidence, causing a second confidence icon to be displayed within the vehicle, the second confidence icon including an emoticon conveying an emotion corresponding to the determined second confidence for the autonomous operation of the vehicle along the future travel path, the second confidence icon being displayed near the future travel path on the map.

15. A method of presenting a confidence in an autonomous operation of a vehicle, the method comprising:
  acquiring at least one operational status for at least one support system of the vehicle;
  determining, based on the acquired at least one operational status, a first confidence for an autonomous operation of the vehicle for a present time;
  determining, based on the acquired at least one operational status, a second confidence for the autonomous operation of the vehicle for a second time, the second time being a future time later in time than the present time;
  determining, based on the acquired at least one operational status, a third confidence for the autonomous operation of the vehicle at a third time, the third time being later in time than the second time; and
  responsive to determining the first, second, and third confidences, causing a first confidence icon, a second confidence icon, and a third confidence icon to be displayed within the vehicle as a function of time,
  wherein the first confidence icon including an emoticon conveying an emotion corresponding to the determined first confidence, the second confidence icon including an emoticon conveying an emotion corresponding to the determined second confidence, and the third confidence icon including an emoticon conveying an emotion corresponding to the determined third confidence.

* * * * *